No. 799,471. PATENTED SEPT. 12, 1905.
J. KINCAID.
SHAFT SLEEVE FOR ROLLER BEARINGS.
APPLICATION FILED DEC. 4, 1903. RENEWED AUG. 10, 1905.
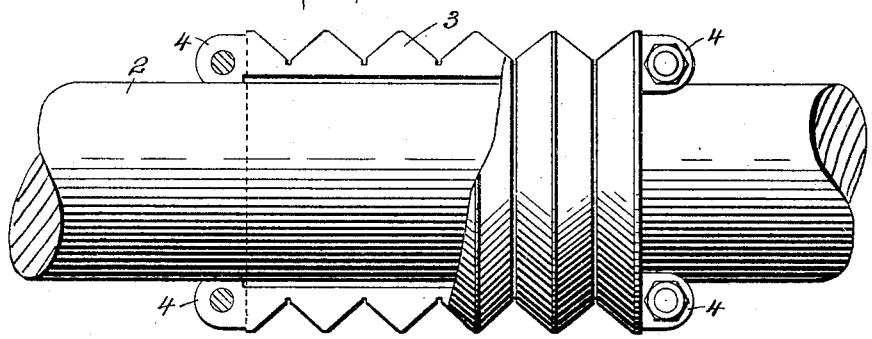
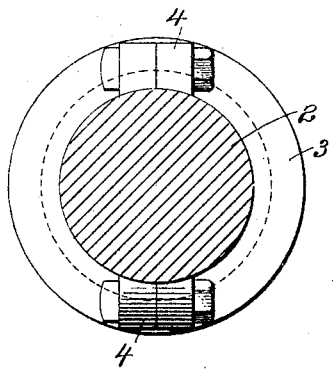
WITNESSES:
F. C. Gibson
John T. Schnott
INVENTOR
John Kincaid.
BY
Fred G. Dieterich
ATTORNEY

UNITED STATES PATENT OFFICE.

JOHN KINCAID, OF VANCOUVER, CANADA.

SHAFT-SLEEVE FOR ROLLER-BEARINGS.

No. 799,471.    Specification of Letters Patent.    Patented Sept. 12, 1905.

Application filed December 4, 1903. Renewed August 10, 1905. Serial No. 273,676.

*To all whom it may concern:*

Be it known that I, JOHN KINCAID, a citizen of the Dominion of Canada, residing at the city of Vancouver, in the Province of British Columbia, Canada, have invented a new and useful Improvement in Shaft-Sleeves for Roller-Bearings, of which the following is a specification.

My invention relates to an improved shaft-sleeve designed to form an attachment to a shaft or axle to facilitate the application thereto of the form of roller-bearing illustrated and described in my United States Patent No. 730,773. In the application of the double-cone roller therein described to a shaft or axle bearing it is obviously inadvisable under many circumstances to groove the shaft itself to receive the rollers, and it becomes necessary to secure to the shaft a sleeve provided with grooves of the desired form to take the rollers. This sleeve may be made of harder material than that of the shaft and be made in one piece; but to insure that it has a nip or hold on the shaft it is preferable to construct it in two parts, which construction also enables the sleeve to be applied to shafts having flanges or pulleys secured on them. The construction of such a sleeve and the manner of securing the two parts together and to the shaft are fully set forth in the following specification, reference being made to the accompanying drawings, in which—

Figure 1 is a view of a sleeve with a portion removed to show the plane of the joint; Fig. 2, an end view of the same.

In the views the shaft to which the sleeve is applied is represented by 2, the sleeve with its roller-grooves being indicated by 3.

In the construction revealed in Figs. 1 and 2 the two halves of the grooved sleeve 3 are secured by fitted bolts or screws through lugs 4, projecting from the ends of each half. In the figures under consideration such lugs and their attaching-bolts are shown as within the outside diameter of the sleeve; but this is merely for application to a particular form of box, and the lugs may project beyond such diameter if occasion requires.

The internal diameter of the sleeves 3 may be greater than the external diameter of the shaft 2, the lugs 4 serving to grip the shaft 2, as clearly shown in Fig. 1 of the drawings.

The construction illustrated in Figs. 1 and 2 is especially designed for use where the grooves of the sleeve are cast in a chill and not machined, the joint being made by parting plates nearly through and the halves burst apart after the sleeve has been bored for the shaft and the holes fitted.

I am aware that prior to my invention sleeves and collars in halves have been secured to shafts by holes or screws or by screwed retaining-rings. I do not, therefore, desire to claim such construction broadly; but

What I claim as new, and desire to be protected in by Letters Patent, is—

1. An axially-divided sleeve for roller-bearings, provided with a series of V-shaped external grooves adapted to receive reversely-cone-shaped rollers, lugs carried on each end of the divided sleeve and projecting parallel to and in the same direction as the shaft, said lugs adapted to grip the shaft, and bolts passing through the said lugs to hold them in their shaft-gripping position for the purposes specified.

2. An axially-divided sleeve for roller-bearings provided with a series of V-shaped external grooves adapted to receive reversely-cone-shaped rollers, said sleeve having an internal diameter greater than the shaft upon which it is to be mounted so as to be spaced therefrom, lugs carried at each end of the divided sleeve and projecting endwise and parallel to and in the same direction as the shaft, said lugs adapted to grip the shaft and bolts passing through said lugs to hold them in their shaft-gripping position, for the purposes specified.

In testimony whereof I have signed my name to this specification in the presence of two subscribing witnesses.

JOHN KINCAID.

In presence of—
ROWLAND BRITTAIN,
ELLICE WEBBER.